Patented Nov. 13, 1934

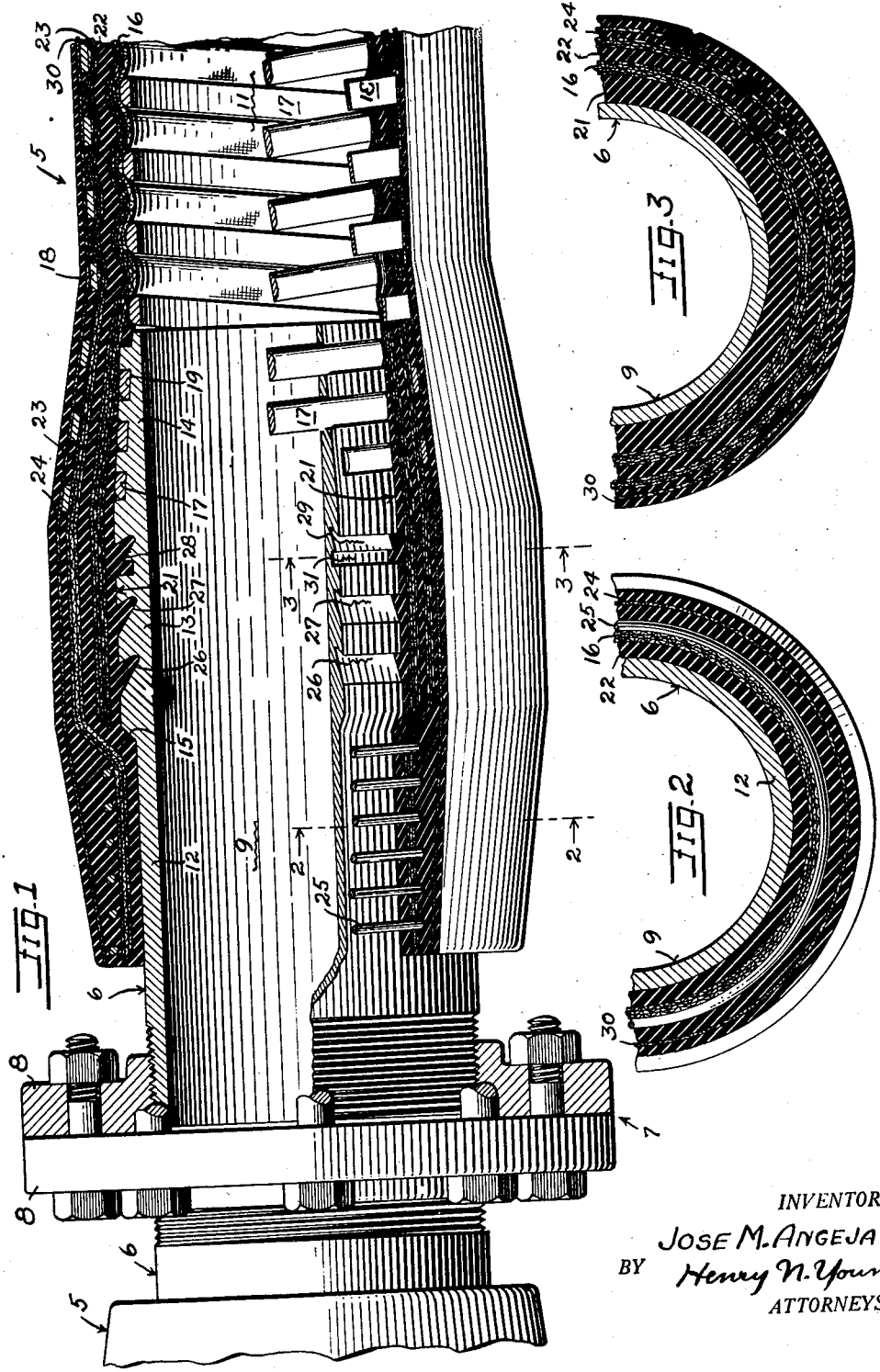

1,980,466

UNITED STATES PATENT OFFICE 1,980,466

HOSE CONNECTION

Jose M. Angeja, Oakland, Calif.

Application February 23, 1932, Serial No. 594,488

4 Claims. (Cl. 285—80)

The invention relates to a means of connecting a metallic pipe or sleeve to a flexible hose or the like.

An object of the invention is to provide an improved connection of the character described which is particularly designed for use with heavy-duty hose.

Another object of the invention is the production of such a jointure in the connection that the same is sealed against leakage of a fluid therethrough either by reason of pressure or capillary action.

A further object is to provide the connection during the fabrication of a built-up hose.

The invention possesses other objects and features of advantage, some of which, with the foregoing, will be set forth or be apparent in the following description of typical embodiments of the invention which are illustrated in the accompanying drawing, in which, Figure 1 is a longitudinal and partially sectional view showing the connection of present invention applied at the jointure of an armored hose and nipple elements of a coupling.

Figure 2 is a fragmentary section at 2—2 in Figure 1.

Figure 3 is a fragmentary section at 3—3 in Figure 1.

As particularly illustrated, the invention is disclosed as applied at the jointure of a built-up hose 5 with a nipple element 6 of a coupling 7, the latter comprising a pair of the nipple elements 6 provided with flanges 8 for bolting together to connect different sections of hose 5. In the present instance the flanges 8 are threadedly mounted on the connection ends of the nipples 6. While the present nipples 6 form parts of a coupling means, it is to be noted that the disclosed use thereof is primarily illustrative, the present invention more broadly concerning the jointure between any tubular element of rigid material and a flexible hose.

Each nipple element 6, it will now be noted is formed in a novel and peculiar manner for having a hose end fabricated thereabout. Internally, the element 6 is provided with a uniform bore 9 for registration with the bore 11 of the hose 5 therebeyond whereby said element provides an unrestricted continuation of the hose passage. Externally, the element 6 is variably formed to define differing portions 12 and 13 and 14 therealong. The portion 14 comprises an inner part of the element and is conically expanded from its free end to a juncture with the intermediate portion 13, the latter portion being of cylindric outline. At least that part of the portion 12 which is nearest the portion 13 and is to extend within the hose is cylindric and is of somewhat smaller diameter than the latter portion, a bevelled shoulder 15 being defined at the juncture of these portions.

It will now be noted that jointures of heavy-duty hose with pipes or the like, as previously constructed, have been more or less subject to leakage, particularly under high pressure conditions or when oily liquids are to be conveyed therethrough. This effect has been largely due to a capillary creep of the liquid both along and between the engaged hose and pipe surfaces, and through an inner fabric layer if the latter is provided in the hose structure. The present invention particularly concerns the prevention of the aforesaid capillary creep in joints of the character described, and is shown as applied to a usual type of hose formed with an inner fabric layer 16, said hose internally and externally reinforced by means of helically wound bands or ribbons 17 and 18 respectively. The bands 17 and 18 are cooperative in the hose structure to prevent a variation of the hose bore due to any internal or external pressure, and the hose bore 11 is jointly defined by the fabric layer 16 and band 17.

To insure a proper anchorage of the band 17 with the element 6, the tapered inner element portion is provided with a peripheral and helical groove 19 in which the outermost band portion is engaged before the hose is fabricated. Preferably, and as shown, the groove 18 is formed to receive the engaged band portion wholly therein, and said groove has substantially the same helical pitch as the band portion beyond the element 6. The fabric layer 16 is arranged to more or less bulge inwardly between the folds of the band 17, and for this reason the band is, as shown, preferably of general segmental section its flat face inward.

Referring now to the fabrication of the hose 5 at and beyond the element 6, the first step is to coat the exterior of the nipple with an unvulcanized and homogeneous rubber preparation, and from its inner end to the shoulder 15, to provide a layer 21 of said material. Preferably, and as shown, the layer 21 tapers to a thin edge at the inner end of the element and fills all depressions along the element as at the groove 19 and about the band 17 therein. The fabric layer 16 is then applied about the band 17 and the layer 21, it being noted that the layer 16 terminates somewhat inwardly of the point on the element 6 from which the finished and overlying hose structure is arranged to extend. A second layer 22 of the aforesaid rubber material is now applied about the structure, said layer extending from the hose extremity at the aforesaid point of the element for the entire hose length and joining the layer 21 at the outer end thereof.

Outwardly of the layer 22 other layers of suitable material are placed to build the hose up to a requisite thickness and strength. As particularly shown, the latter layers comprise a fabric layer 23 contacting the rubber layer 22 and a rubber layer 24 exclosing the whole structure. Opposite the portion 12 of the nipple element 6, an encircling wire 25 is preferably embedded in the layer 24, and the outer band 18 is also embedded in the latter layer to overlie at least the element portion 14 and to extend for the full length of the hose. The wire 25 is primarily provided for preventing an expansion of the hose portion at the element portion 12. The rubber layer 24 may also contain a breaker strip 30 of canvas or the like near its outer surface.

With the hose fabricated as now described, the entire structure is subjected to heat whereby the rubber portions thereof may be vulcanized for providing a permanent and bonded structure of the whole. It is to be noted that bonding and sealing substances other than those containing rubber might be used in the layers 21, 22 and 24 for carrying out the present invention. It will now be particularly noted that the jointure of the rubber layers 21 and 22 is arranged to provide a complete embedding in the rubber composition of that portion of the fabric layer 16 which lies opposite the element 6, said composition understood to be impervious to the liquid to be conveyed through the hose. In this manner, a dead end sealing is provided from the fabric layer whereby capillary seepage therefrom is positively prevented.

The present jointure of the hose 5 and nipple element 6 is also designed to positively prevent a seepage of liquid along the element, and to that end annular grooves 26 and 27 and 28 are provided at the outer face of the element portion 13. Preferably, and as shown, said grooves are generally oblique to the element axis and slope toward the inner end of the element. The grooves 26 and 27 are shown as alike, but the groove 28, besides having an oblique portion 29 corresponding to the grooves 26 and 27, also has an outer and radial portion 31 which is perpendicular to the element axis whereby the groove 28 is wider at its base. The grooves 26 and 27 and 28 are all filled with rubber of the layer 21 thereof, and the effect of any pressure of liquid entering along the metal surfaces defining them is to axially compress the rubber thereon to thereby seal the opposite groove face therewith against passage of the liquid.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a jointure of the character described, a hose comprising an inner layer of liquid-pervious fabric defining the hose bore and terminating short of the hose end, a layer of rubber composition overlying the fabric layer and extending from the hose end for the length of the hose, a pipe element disposed within the hose bore to extend inwardly of the end of said fabric layer and providing a shoulder extending circumferentially therearound opposite the end of said fabric layer, a layer of the rubber composition interposed between the element and fabric layer and joining the first layer of rubber composition beyond the end of the said fabric layer whereby the latter is completely embedded in the rubber composition at the pipe element, a second fabric layer extending from the said hose end and engaging about said first layer of rubber composition, and a tying member tensionally encircling said second fabric layer and first layer of rubber composition outwardly of said shoulder of the pipe, said rubber layers vulcanized in their places and to the elements contacted by them.

2. In a jointure of the character described, a hose comprising an inner layer of liquid-pervious fabric defining the hose bore and terminating short of the hose end, a layer of rubber composition overlying the fabric layer and extending from the hose end for the length of the hose, a pipe element disposed within the hose bore to extend inwardly of the end of said fabric layer, a layer of the rubber composition interposed between the element and fabric layer and integrally joining the first layer of rubber composition beyond the end of the said fabric layer whereby the latter is completely embedded in the rubber composition at the pipe element, and a second fabric layer extending from said hose end and engaging about said first layer of rubber composition, said rubber layers vulcanized in their places and to the elements contacted by them.

3. In a jointure of the character described, a hose comprising an inner layer of fabric terminating short of the hose end, a layer of a fluid-impervious and pliable composition overlying said fabric layer and extending from the hose end for the length of the hose, a pipe member disposed within the hose end and within the end portion of said fabric layer and providing an external shoulder extending circumferentially therearound opposite the end of said fabric layer, a layer of said composition interposed between the element and the fabric layer and integrally joining the first layer of said composition beyond the end of the fabric layer whereby the latter is completely embedded in the said composition at the pipe element, and a second fabric layer extending from the said hose end and engaging about said first composition layer, said composition layers directly adherent to the elements contacting them.

4. In a jointure of the character described, a laminated hose having an inner layer of fluid-pervious fabric terminating short of the hose end, a hose layer of a fluid-impervious composition adherent to and overlying said fabric layer and extending from the hose end, a rigid pipe member extending within the hose end and within the end portion of said fabric layer, a layer of the aforesaid composition adherent to and interposed between the element and the fabric layer and integrally joining the first layer of said composition beyond the end of the said fabric layer whereby the latter is completely enclosed in the said composition thereat, and a second fabric layer of the hose extending from said hose end and adherently engaging with and about said first composition layer.

JOSE M. ANGEJA.